United States Patent [19]

Nomura et al.

[11] Patent Number: 5,442,373
[45] Date of Patent: Aug. 15, 1995

[54] DISPLAY-INTEGRATED TYPE TABLET DEVICE

[75] Inventors: Toshio Nomura, Tenri; Takao Tagawa, Kashihara; Noritoshi Kako, Nara, all of Japan

[73] Assignee: Sharp Kabushikik Kaisha, Osaka, Japan

[21] Appl. No.: 65,882

[22] Filed: May 19, 1993

[30] Foreign Application Priority Data

May 22, 1992 [JP] Japan .................... 4-4130695

[51] Int. Cl.⁶ ............................................ G09G 3/36
[52] U.S. Cl. ................................... 345/104; 345/173
[58] Field of Search ............... 345/178, 179, 182, 174, 345/104, 173; 178/19

[56] References Cited

U.S. PATENT DOCUMENTS

| | | | |
|---|---|---|---|
| 4,798,920 | 1/1989 | Makino et al. | 178/19 |
| 4,818,851 | 4/1989 | Kimura . | |
| 4,839,634 | 6/1989 | More et al. . | |
| 4,841,290 | 6/1989 | Nakano et al. | 345/182 |
| 4,845,346 | 7/1989 | Ouchi et al. | 345/178 |
| 4,947,156 | 8/1990 | Sato et al. | 345/178 |
| 5,070,325 | 12/1991 | Tanaka et al. | 345/179 |

FOREIGN PATENT DOCUMENTS

0375328A2 6/1990 European Pat. Off. .

Primary Examiner—Richard Hjerpe
Assistant Examiner—Vivian W. Chang
Attorney, Agent, or Firm—David G. Conlin; Peter F. Corless

[57] ABSTRACT

Displacement between an actual designation position designated by a detection pen and a detection coordinates is corrected. A correction calculation section includes a plurality of processing mode determination modules, a propagation delay correction module, an inward displacement correction module, a waveform distortion correction module, and a periodical fluctuation correction module. The processing mode determination module determines a correction module according to a detection coordinate value input. Each of the correction modules includes a correction formula or a lookup table inherent to each area. According to the correction formula or the lookup table, input detection coordinate value is corrected to thereby correct the displacement between the actual designation position and the detection coordinate value.

1 Claim, 18 Drawing Sheets

Fig. 11
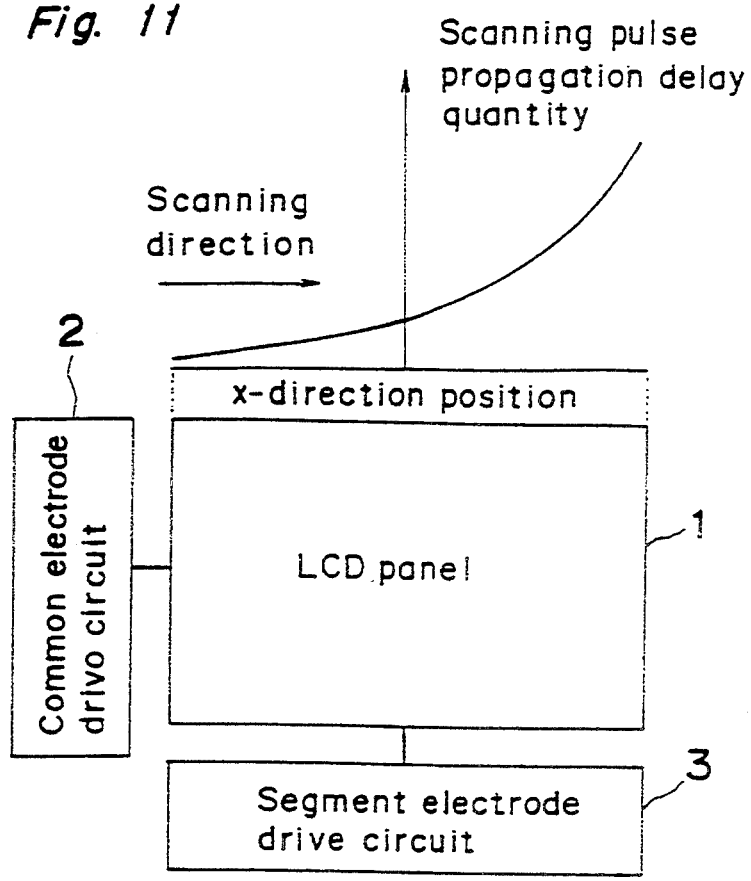
Fig. 12
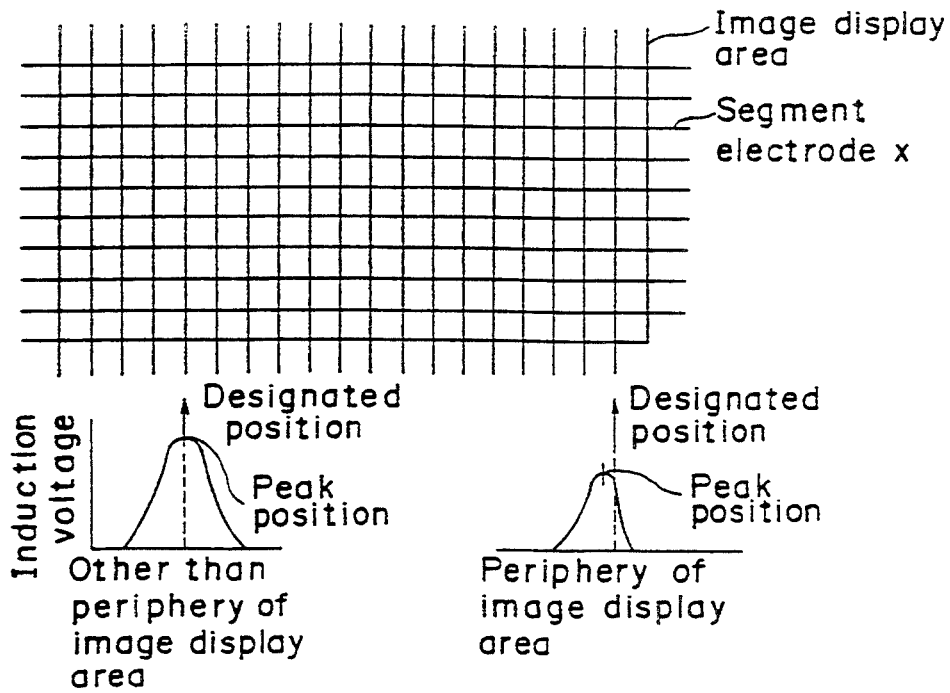
FIG. 12A
FIG. 12B    FIG. 12C

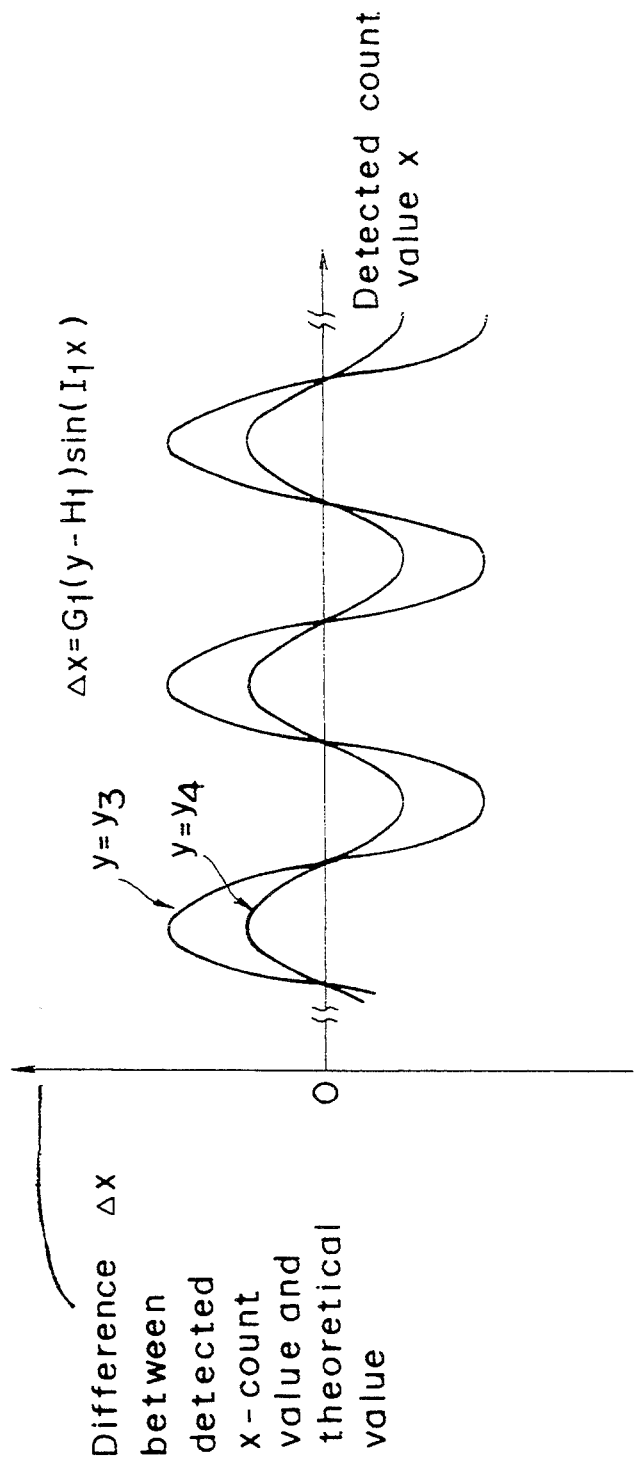

Fig. 20

| Area | Correction mode | Object coordinate | Correction formula |
|---|---|---|---|
| Entire area | Propagation delay | y | $y = y - (Ax^2 + Bx + C)$ |
| Upper area | Inward displacement | y | $y = E_1 - \{(y + F_1)/D_1\}^{1/2}$ |
| Upper area | Periodical fluctuation | x | $x = x - G_1(y - H_1)\sin(I_1 x)$ |
| Upper left corner area | Inward displacement | x | $x = K_1 + \{(x + L_1)/J_1\}^{1/2} + M_1(y - N_1)$ |
| Lower area | Inward displacement | y | $y = E_2 + \{(y + F_2)/D_2\}^{1/2}$ |
| Lower area | Periodical fluctuation | x | $x = x - G_2(y - H_2)\sin(I_2 x)$ |
| Lower left corner area | Inward displacement | x | $x = K_2 + \{(x - L_2)/J_2\}^{1/2} + M_2(y - N_2)$ |
| Right area | Inward displacement | x | $x = E_3 - \{(x - F_3)/D_3\}^{1/2}$ |
| Left area | Inward displacement | x | $x = E_4 + \{(x - F_4)/D_4\}^{1/2}$ |
| Left area | Waveform distortion | x | $x = Q + \{(x - R)/P\}^{1/2}$ |

Fig.21

| input (y) | $i_0$ | $i_1$ | $i_2$ | —— | $i_k$ | —— | $i_m$ |
|---|---|---|---|---|---|---|---|
| output (y) | $e_0$ | $e_1$ | $e_2$ | —— | $e_k$ | —— | $e_m$ |

$$\begin{cases} i_k = i_{k-1}+1 \\ e_k = E_1 - \{(i_k - F_1)/D_1\}^{1/2} \end{cases}$$

Fig.22

| input (x) \ input (y) | $i_{y0}$ | $i_{y1}$ | $i_{y2}$ | —— | $i_{yl}$ | —— | $i_{yn}$ |
|---|---|---|---|---|---|---|---|
| $i_{x0}$ | $e_{00}$ | $e_{01}$ | $e_{02}$ | —— | $e_{0l}$ | —— | $e_{0n}$ |
| $i_{x1}$ | $e_{10}$ | $e_{11}$ | $e_{12}$ | —— | $e_{1l}$ | —— | $e_{1n}$ |
| $i_{x2}$ | $e_{20}$ | $e_{21}$ | $e_{22}$ | —— | $e_{2l}$ | —— | $e_{2n}$ |
| │ | │ | │ | │ | | │ | | │ |
| $i_{xk}$ | $e_{k0}$ | $e_{k1}$ | $e_{k2}$ | —— | $e_{kl}$ | —— | $e_{kn}$ |
| │ | │ | │ | │ | | │ | | │ |
| $i_{xm}$ | $e_{m0}$ | $e_{m1}$ | $e_{m2}$ | —— | $e_{ml}$ | —— | $e_{mn}$ |

$$\begin{cases} i_{xk} = i_{x(k-1)}+1, \ i_{yl} = i_{y(l-1)}+1 \\ e_{kl} = i_{xk} - G_1(i_{yl} - H_1)\sin(I_1 i_{xk}) \end{cases}$$

DISPLAY-INTEGRATED TYPE TABLET DEVICE

BACKGROUND OF THE INVENTION

The present invention relates to a display-integrated type tablet device for use in a personal computer, a word processor, or the like.

As a means for inputting a handwritten letter or a figure into a computer or a word processor, there has been put into practical use a display-integrated type tablet device which is formed by laminating an electrostatic induction type tablet on a liquid crystal display and is capable of receiving an input of a letter or a figure into its electrostatic induction type tablet as if the letter or figure were written on a paper by writing implements. However, in such a display-integrated type tablet device, electrodes are viewed as a grating on the display screen due to a difference in reflectance or transmittance between a portion having an electrode and a portion having no electrode, which has been a cause of degrading the quality of an image displayed on the liquid crystal display screen.

As a tablet free of the above-mentioned drawback, lately a display-integrated type tablet device as shown in FIG. 8 is proposed (Japanese Patent Application No. 3-46751 and a copending U.S. patent application No. 07/849 733). It should be noted that the device of FIG. 8 was invented by one of the inventors of this invention, and was yet not open when this invention was made, and therefore is not a prior art.

In the above-mentioned display-integrated type tablet device, electrodes concurrently serve as image display electrodes of a liquid crystal display (LCD) and as coordinate detection electrodes of an electrostatic type tablet device. There are provided in one frame period a coordinate detection period when designated coordinates on the tablet are detected and an image display period when an image is displayed as shown in FIG. 9 to time-sharingly effect the coordinate detection and image display.

Referring to FIG. 8, an LCD panel 1 is constructed by interposing liquid crystals between common electrodes $Y_1$ through $Y_n$ (an arbitrary common electrode represented by Y hereinafter) and segment electrodes $X_1$ through $X_m$ (an arbitrary segment electrode represented by X hereinafter) which are arranged at right angles to each other, in which each portion where a common electrode Y and a segment electrode X cross each other constitutes each pixel. In other words, $n \times m$ dot pixels are arranged in matrix in the LCD panel 1.

The above-mentioned display-integrated type tablet device has an advantage of permitting cost reduction as well as compact and light weight design by virtue of the concurrent use of the electrodes and drive circuits as those of the liquid crystal display and those of the electrostatic induction type tablet in addition to an advantage of making the grating-shaped electrodes invisible for a better image presentation in contrast to the conventional type formed by laminating the electrostatic induction type tablet on the liquid crystal display.

The above-mentioned display-integrated type tablet device operates as follows. A common electrode drive circuit 2 for driving the common electrode Y and a segment electrode drive circuit 3 for driving the segment electrode X are connected to a display control circuit 5 and a detection control circuit 6 via a switching circuit 4. The switching circuit 4 is controlled by a control circuit 7 so that it outputs an output signal from the display control circuit 5 to the common electrode drive circuit 2 and the segment electrode drive circuit 3 in an image display period or outputs an output from the detection control circuit 6 to the common electrode drive circuit 2 and the segment electrode drive circuit 3 in a coordinate detection period.

Although the switching circuit 4, the display control circuit 5, the detection control circuit 6, and the control circuit 7 are expressed dividedly in blocks in FIG. 8, the circuits are integrated in an LSI (Large Scale Integrated) circuit in practice. Therefore, the LSI cannot be strictly sectioned into such blocks in a practical circuit arrangement.

In the above-mentioned image display period, there are output, from the display control circuit 5, shift data s from a shift data output terminal S, an inverted signal fr from an inverted signal output terminal FR, a clock signal cp1 from a clock output terminal CP1, a clock signal cp2 from a clock output terminal CP2, and display data $D_0$ through $D_3$ from data output terminals D0 through D3.

The above-mentioned clock signal cp1 is a clock signal which has a period when pixels in one line display an image, and the signal is input as a clock signal cp1o to a clock input terminal YCK of the common electrode drive circuit 2 and a latch pulse input terminal XLP of the segment electrode drive circuit 3 via an output terminal CP1O of the switching circuit 4. The shift data s which is a pulse signal for selecting a specified common electrode Y is input as shift data so to a shift data input terminal DIO1 of the common electrode drive circuit 2 in synchronization with the clock signal cp1o via an output terminal SO of the switching circuit 4.

When the shift data so is input to the common electrode drive circuit 2, the pulse position of the shift data so is shifted in a shift register in synchronization with the clock signal cp1o, and drive pulses of a common electrode drive signal are applied to the common electrodes $Y_1$ through $Y_n$ from output terminals O1 through On of the common electrode drive circuit 2 in correspondence with the shift position. The common electrode drive signal is generated based on bias power sources $V_0$ through $V_5$ supplied from a DC power supply circuit 12.

The above-mentioned clock signal cp2 is a clock signal which has a period being a division of a period when pixels in one line displays an image, and the signal is input as a clock signal cp2o to a clock input terminal XCK of the segment electrode drive circuit 3 via an output terminal CP2O of the switching circuit 4.

The image display data $D_0$ through $D_3$ are input as display data $D_0o$ through $D_3o$ to input terminals XD0 through XD3 of the segment electrode drive circuit 3 via output terminals D0O through D3O of the switching circuit 4, and then successively taken into a register in the segment electrode drive circuit 3 in synchronization with the clock signal cp2o. When all the image display data corresponding to the pixels in one line are taken in, the display data taken in are latched at a timing of the clock signal cp1o input to the latch pulse input terminal XLP. Then drive pulses of the segment electrode drive signal corresponding to the display data are applied from output terminals O1 through Om of the segment electrode drive circuit 3 to the segment electrodes $X_1$ through $X_m$. The segment drive signal is also generated based on the bias power sources $V_0$ through $V_5$ supplied from the DC power supply circuit 12.

It is noted that the inversion signal fr is a signal for preventing the possible deterioration of the liquid crystals due to electrolysis by periodically inverting the direction of voltage application to the liquid crystals in the image display period. The inversion signal fr is input as an inversion signal fro to an inversion signal input terminal YFR of the common electrode drive circuit 2 and an inversion signal input terminal XFR of the segment electrode drive circuit 3 via an inversion signal output terminal FRO of the switching circuit 4.

Thus the pixel matrix of the LCD panel 1 is line-sequentially driven by the operations of the above-mentioned common electrode drive circuit 2 and the segment electrode drive circuit 3 to display an image corresponding to the display data $D_0$ through $D_3$ on the LCD panel 1.

In the aforementioned coordinate detection period, there are output, from the detection control circuit 6, shift data sd from a shift data output terminal Sd, an inversion signal frd from an inversion signal output terminal FRd, a clock signal cp1d from a clock output terminal CP1d, a clock signal cp2d from a clock output terminal CP2d, and drive data $D_0d$ through $D_3d$ from data output terminals D0d through D3d.

The clock signal cp1d is a clock signal which has a period when one common electrode Y is scanned, and the signal is input as the clock signal cp1o to the clock input terminal YCK of the common electrode drive circuit 2 and the latch pulse input terminal XLP of the segment electrode drive circuit 3 via the output terminal CP1O of the switching circuit 4. Meanwhile, the shift data sd which is a pulse signal for selecting a specified common electrode Y is input as the shift data so to the shift data input terminal DIO1 of the common electrode drive circuit 2 via the output terminal SO of the switching circuit 4 in synchronization with the aforementioned clock signal cp1d.

Then, in the same manner as described above, the pulse position of the shift data so is shifted in the shift register of the common electrode drive circuit 2 in synchronization with the clock signal cp1o, and scanning pulses of common electrode drive signals $Y_1$ through $Y_n$ (arbitrary common electrode scanning signal represented by y hereinafter) are successively applied from the output terminals O1 through On corresponding to the shift position to the common electrodes $Y_1$ through $Y_n$. The common electrode scanning signal y is generated based on the bias power sources $V_0$ through $V_5$ supplied from the DC power supply circuit 12.

The above-mentioned clock signal cp2d is a clock signal which has a period when the segment electrode X is scanned, and the signal is input as the clock signal cp2o to the clock input terminal XCK of the segment electrode drive circuit 3 via the output terminal CP2O of the switching circuit 4.

The drive data $D_0d$ through $D_3d$ are input as drive data $D_0o$ through $D_3o$ to the input terminals XD0 through XD3 of the segment electrode drive circuit 3 via the output terminals D0O through D3O of the switching circuit 4, and then successively taken into the register of the segment electrode drive circuit 3 in synchronization with the clock signal cp2o. Then scanning pulses of the segment electrode scanning signals $x_1$ through $x_m$ (arbitrary segment electrode scanning signal represented by x hereinafter) corresponding to the above-mentioned drive data are output from the output terminals O1 through $O_m$ of the segment electrode drive circuit 3 to segment electrodes $X_1$ through Xm. The segment electrode scanning signal x is also generated based on the bias power sources $V_0$ through $V_5$ supplied from the DC power supply circuit 12.

FIG. 10 is a timing chart of the scanning signals in the coordinate detection period of the above-mentioned display-integrated type tablet device. The coordinate detection period is separated into an x-coordinate detection period and a subsequent y-coordinate detection period. In the x-coordinate detection period, the segment electrode scanning signal x which is a pulse voltage signal is sequentially applied to the segment electrode X. In the y-coordinate detection period, the common electrode scanning signal y which is a pulse voltage signal is sequentially applied to the common electrode Y.

With the application of the above-mentioned pulse voltage signals, a voltage is induced at a designation coordinate detection pen (referred to merely as the "detection pen" hereinafter) 8 due to a floating capacity between the segment electrode X or the common electrode Y and a tip electrode of the detection pen 8. The voltage induced at the detection pen 8 is amplified in an amplifier 9 and then input to an x-coordinate detection circuit 10 and a y-coordinate detection circuit 11.

The x-coordinate detection circuit 10 and the y-coordinate detection circuit 11 detect an x-coordinate value or a y-coordinate value of a position designated by the detection pen 8 by detecting a period from the time when the pulse voltage signal is applied to the time when an induction voltage takes its maximum value based on an output from the amplifier 9 and a timing signal from the control circuit 7.

In the above case, the width of the scanning pulse applied to the segment electrode X or the common electrode Y (referred to merely as the "scanning electrode" hereinafter) is determined by giving shift data so having a high logic level "H" to an input terminal of the shift register in the first stage for a period from the time of starting the detection to the time when pulses are shifted in the shift register by a specified frequency so that an optimum pulse width is achieved with respect to a filter coefficient and position detection accuracy in the analog data processing of the detection signal induced at the detection pen 8. In other words, the scanning pulse has a width corresponding to the width of a plurality of electrode lines, the width being equal to the pulse width of the shift data so.

It is assumed for simplicity of description hereinafter that the common electrode Y is located in an upper position and the segment electrode X is located in a lower position.

The above-mentioned display-integrated type tablet device, however, has the following problems.

<First problem>

The circuit composed of the scanning electrodes and the common electrode drive circuit 2 or the segment electrode drive circuit 3 (referred to merely as the "driver" hereinafter) is idealistically a lumped parameter circuit. Therefore, when a voltage is applied to a scanning electrode by the driver, it is natural that the entire scanning electrode to which the voltage is applied is to have an identical application voltage. Consequently, for example, on an identical common electrode Y, an identical y-coordinate value is to be obtained when whatever portion of the electrode is designated by the detection pen 8.

However, since the resistance of the scanning electrode and the capacitance between the upper and lower scanning electrodes constituting each pixel cannot be ignored, the above-mentioned circuit is assumed to be a distributed parameter circuit. Therefore, a propagation delay of the application voltage takes place in the scanning electrodes. The propagation delay takes place as displacement of the detection coordinate in the scanning direction. Furthermore, the propagation delay increases in quantity as the designated portion is being away from the driver as shown in FIG. 11, and therefore the detection coordinate differs depending on the distance from the position designated by the detection pen 8 to the driver on an identical electrode.

<Second problem>

As described above, the scanning pulse has a pulse width corresponding to the plural electrode lines. In such a case, taking the x-coordinate as an example, the voltage induced at the detection pen 8 is laterally symmetrical about its peak position in a central portion in the x-direction, where the peak position coincides with the designation position of the detection pen 8 as shown in FIG. 12. However, since there is no segment electrode X outside the image display area where both the scanning electrodes exist, the number of segment electrodes X to which is applied a voltage reduces in a peripheral area in the x-direction of the designation position. Therefore, the voltage induced at the detection pen 8 is laterally asymmetrical about the peak position, and the peak position is displaced inward from the designation position.

As a result, there is a relation between the designation position in the x-direction and the detection x-coordinate value in the central area in y-direction as shown in FIG. 13, and therefore the correct detection coordinate cannot be obtained due to the inward displacement of the detection coordinate in the peripheral area in the x-direction.

<Third problem>

In the time of scanning the lower electrode when viewed from the coordinate detection surface, there is an electrostatic coupling between the lower electrode and the upper electrode in addition to the electrostatic coupling between the lower electrode and the tip electrode of the detection pen 8 in the strict sense of the word, and therefore a voltage is induced at the upper electrode. As a result, in the time of scanning the lower electrode, there is executed a coordinate calculation based on a detection signal formed through superimposition of the detection signal induced at the tip electrode of the detection pen 8 due to the electrostatic coupling between the upper electrode being not scanned and the detection pen electrode on the regular detection signal.

In the above-mentioned case, the scanning pulse has a width corresponding to the width of the plural electrode lines, and therefore a scanning pulse is applied to a certain number of scanning electrodes. Therefore, at the time of starting and ending the scanning of the lower electrode, the number of electrodes to which is applied the voltage among all the lower electrodes changes (i.e., the number increases at the starting time and reduces at the ending time). The above also causes a change of voltage induced at the upper electrodes, which results in increasing the ratio of a component attributed to the induction voltage at the upper electrodes with respect to a component attributed to the scanning of the lower electrodes in the detection signal.

Since the upper electrodes cover the entire scanning area of the lower electrodes, a detection signal having a peak other than the peak corresponding to the regular designation position of the detection pen is output regardless of the position of the detection pen as shown in FIG. 14 at the time of starting and ending the scanning of the lower electrodes, which is an obstacle in detecting the detection pen position through scanning the lower electrodes.

In other words, at the designation position where the peak corresponding to the regular designation position of the detection pen and the other peaks are superimposed (i.e., in the peripheral area of the display screen), the superimposition waveform is distorted to fail in obtaining the correct detection coordinates.

<Fourth problem>

As illustrated in FIG. 15, the scanning electrodes are arranged in parallel in the image display area, however, the electrodes are convergently connected to a driver IC (Integrated Circuit) having a narrow width constituting the aforementioned driver at the end portions. Therefore, a variation in distribution density of the electrodes exists in an area outside the image display area. Since plural number of such ICs are arranged, the above-mentioned distribution density variation pattern corresponds in number to the ICs.

FIG. 16 shows a relation between an x-direction designation position and a detection x-coordinate value in the peripheral area in y-direction (i.e., in the vicinity of the segment drive circuit). Referring to FIG. 16, when no variation in distribution density of the electrodes exists, the detection x-coordinate value has a linear relation to the actual x-direction designation position as indicated by the dotted line. However, actually a curve containing a superimposed periodical fluctuation corresponding to the variation in distribution density of the electrodes as indicated by the solid line results failing in obtaining a correct detection coordinate value.

The number of crests of the fluctuation waveform is equal to the number of the driver ICs, where one period coincides with each of the intervals between the driver ICs. The amplitude of the fluctuation waveform reduces as the designation position is being away from the driver ICs.

SUMMARY OF THE INVENTION

The present invention has been developed with a view to substantially solving the above described disadvantages and has for its essential object to provide an improved display-integrated type tablet device capable of correcting the displacement between the designation position of the detection pen and the detection coordinate value by correcting the influence due to the propagation delay of the scanning pulse with respect to the detection coordinate value at the coordinate detection time, reduction in number of electrodes to which a voltage is applied, inward displacement, any peak irrelevant to the position of the detection pen taking place at the scanning start and end portions, and the variation in distribution density of the electrodes outside the image display area.

In order to achieve the aforementioned object, a first aspect of the present invention provides a display-integrated type tablet device including a display panel driven by first electrodes and second electrodes crossing each other at right angles, a detection pen having at a tip of the detection pen an electrode which can be electrostatically coupled with the first electrodes and the second electrodes of the display panel, a first electrode drive circuit for driving the first electrodes, a second electrode drive circuit for driving the second electrodes, a display control circuit for displaying an image on the display panel by controlling the first electrode drive circuit and the second electrode drive circuit in an image display period, a detection control circuit for sequentially scanning at least one of the first and second electrodes of the display panel by controlling at least one of the first and second drive circuits in a coordinate detection period, and a coordinate detection circuit for detecting at least one of a detection x-coordinate value and a detection y-coordinate value on the display panel designated by the tip of the detection pen based on time of generating an output signal from the detection pen and time of scanning at least one of the first and second electrodes, the display-integrated type tablet device comprising a correction processing circuit which has a processing mode determination module for determining a processing mode to be effected by taking in at least one of the detection x-coordinate value and the detection y-coordinate value detected by the coordinate detection circuit, and a plurality of correction modules for correcting at least one of the detection x-coordinate value and the detection y-coordinate value based on a determination result by the processing mode determination module.

A second aspect of the present invention is characterized in that the plural number of correction modules comprise at least two of:

a propagation delay correction module for correcting propagation delays of scanning pulses applied to the first electrodes and the second electrodes in the coordinate detection period;

an inward displacement correction module for correcting inward displacement of at least one of the detection x-coordinate value and the detection y-coordinate value attributed to a reduction in number of at least one of the first electrodes and the second electrodes to which a scanning pulse is applied;

a waveform distortion correction module for correcting a distortion of at least one of the detection x-coordinate value and the detection y-coordinate value accompanied by a waveform distortion attributed to a peak irrelevant to a position of the detection pen, the peak taking place in an output signal from the detection pen at the time of starting and ending the scanning; and a periodical density fluctuation correction module for correcting periodical fluctuations of the detection x-coordinate value and the detection y-coordinate value caused by variations in distribution density of the first electrodes and the second electrodes in the periphery of an image display area.

A third aspect of the present invention is characterized in that at least two of the propagation delay correction module, the inward displacement correction module, the waveform distortion correction module, and the periodical density fluctuation correction module are integrated into one correction module.

A fourth aspect of the present invention is characterized in that the entire display panel is divided into a plurality of areas, and each of the correction modules has a numerical formula defining a relation between the designation position and at least one of the detection x-coordinate value and the detection y-coordinate value or an LUT formed based on the numerical formula for each of the areas.

A fifth aspect of the present invention is characterized in that when there is an area in which at least one of the four correction processing modes is an unnecessary processing mode, a corresponding numerical formula or LUT of the unnecessary processing mode for the area is eliminated from the relevant correction module.

According to the first inventive device, at least one of a detection x-coordinate value and a detection y-coordinate value designated on the display panel by the detection pen is detected by the coordinate detection circuit. Then at least one of the detection x-coordinate value and the detection y-coordinate value is taken into the processing mode determination module, and then there is determined a processing mode to be effected on the detection coordinate taken in. Based on the result of the determination by the processing mode determination module, a correction operation is effected on the detection coordinate by any one of the above-mentioned plural number of correction modules in the correction processing circuit.

Thus the displacement between the detection coordinate detected by the coordinate detection circuit and the position designated by the detection pen is corrected to allow the correct coordinate designated on the display panel by the detection pen to be obtained.

According to the second inventive device, a correction operation is effected on the detection coordinate by means of at least two of most appropriate correction modules among the propagation delay correction module, the inward displacement correction module, the waveform distortion correction module, and the periodical fluctuation correction module based on the result of the determination by the processing mode determination module to correct the displacement between the detection coordinate and the designation position.

According to the third inventive device, at least two of the propagation delay correction module, the inward displacement correction module, the waveform distortion correction module, and the periodical fluctuation correction module are integrated into one correction module, and the correction operations relevant to the integrated two correction modules are rapidly effected by the one integrated correction module.

According to the fourth inventive device, the entire display panel is divided into a plurality of areas to limit the number of conditional divergences in each processing mode determination module to thereby reduce the load in conditional determination. Furthermore, each correction module has a numerical formula defining the relation between the designation position and the detection coordinates for each area to remarkably reduce the capacity of memory necessary for programming. When there is used instead of the numerical formulas an LUT which is formed based on the numerical formulas, memory capacity is increased but processing time for correction can be remarkably reduced.

According to the fifth inventive device, when there is an area in which at least one of the four correction processing modes is an unnecessary mode, a corresponding numerical formula or LUT of the unnecessary processing mode for the area is eliminated from the relevant correction module to reduce the time necessary for the processing.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 11 is a schematic illustration of a relation between a position on the LCD panel and the quantity of propagation delay of a scanning pulse;

FIG. 12 is a diagram showing a difference between waveforms of a detection signal induced at the detection pen depending on designation positions;

FIG. 19 is a graph showing a relation between a detected x-count value and the difference between the detected x-count value and its theoretical value in a periodical fluctuation correction operation;

FIG. 20 is a table of correction formulas necessary for the correction processing flowchart shown in FIG. 6;

FIG. 21 is an exemplified LUT (look-up table) for executing an upper area inward displacement correction operation; and FIG. 22 is an exemplified LUT for executing an upper area periodical fluctuation correction operation.

DETAILED DESCRIPTION OF THE PREFERRED EMBODIMENTS

The following describes embodiments of the present invention with reference to the attached drawings.

Figure 1:
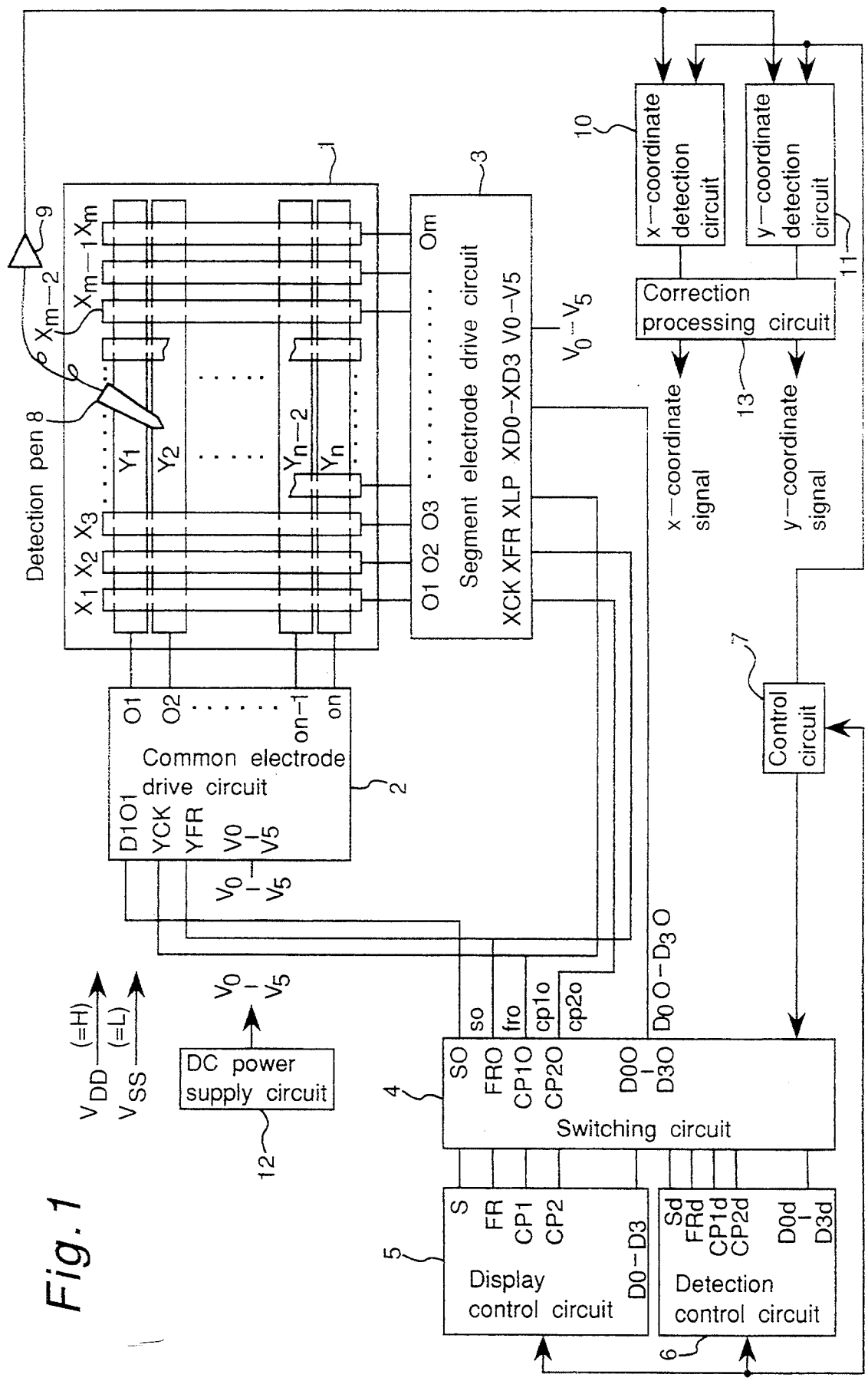
FIG. 1 is a block diagram of a display-integrated type tablet device in accordance with an embodiment of the present invention.
Figure 8:
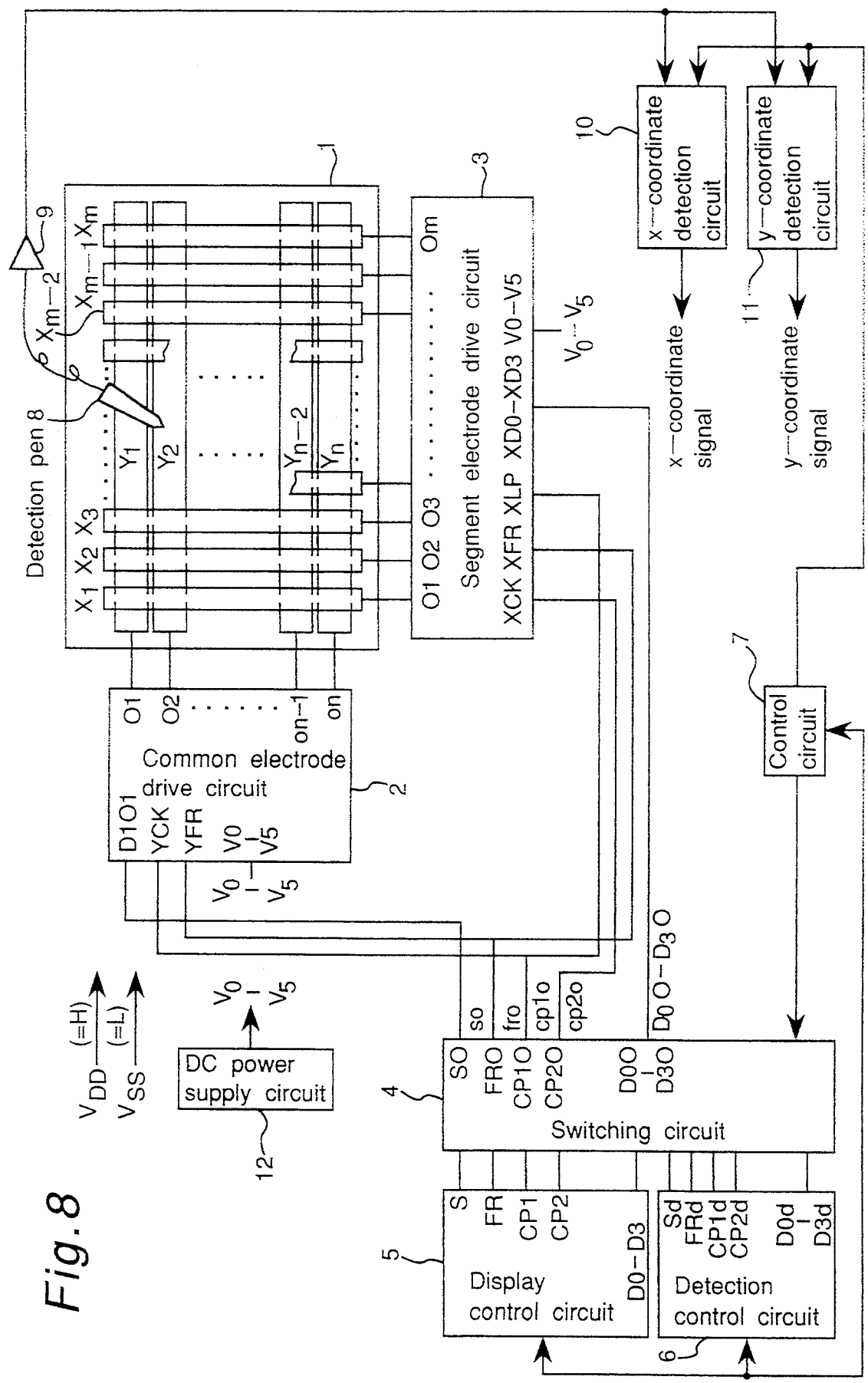
FIG. 8 is a block diagram of a display-integrated type tablet device.
Figure 9:
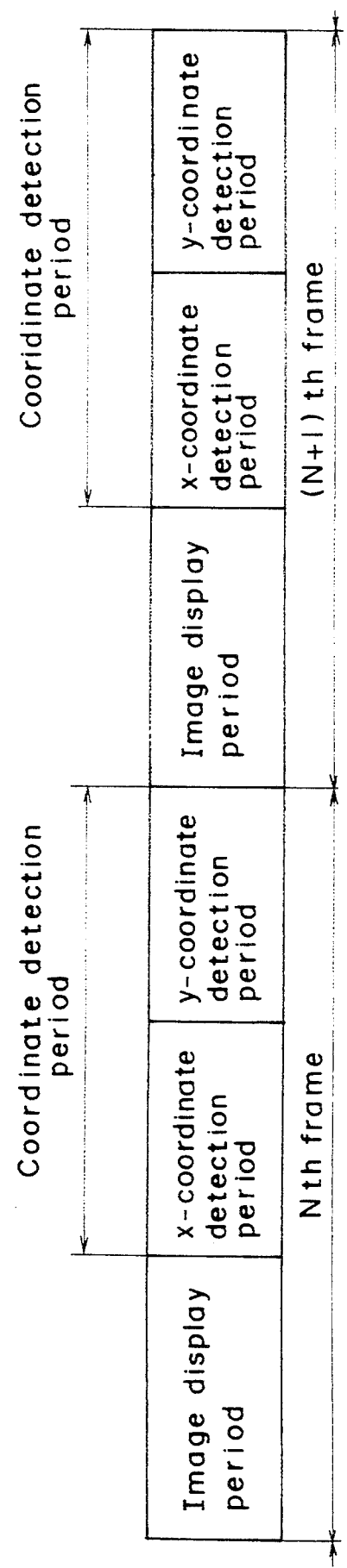
FIG. 9 is an exemplified pattern of an image display period and a coordinate display period in the display-integrated type tablet device as shown in FIG. 8.
Figure 10:
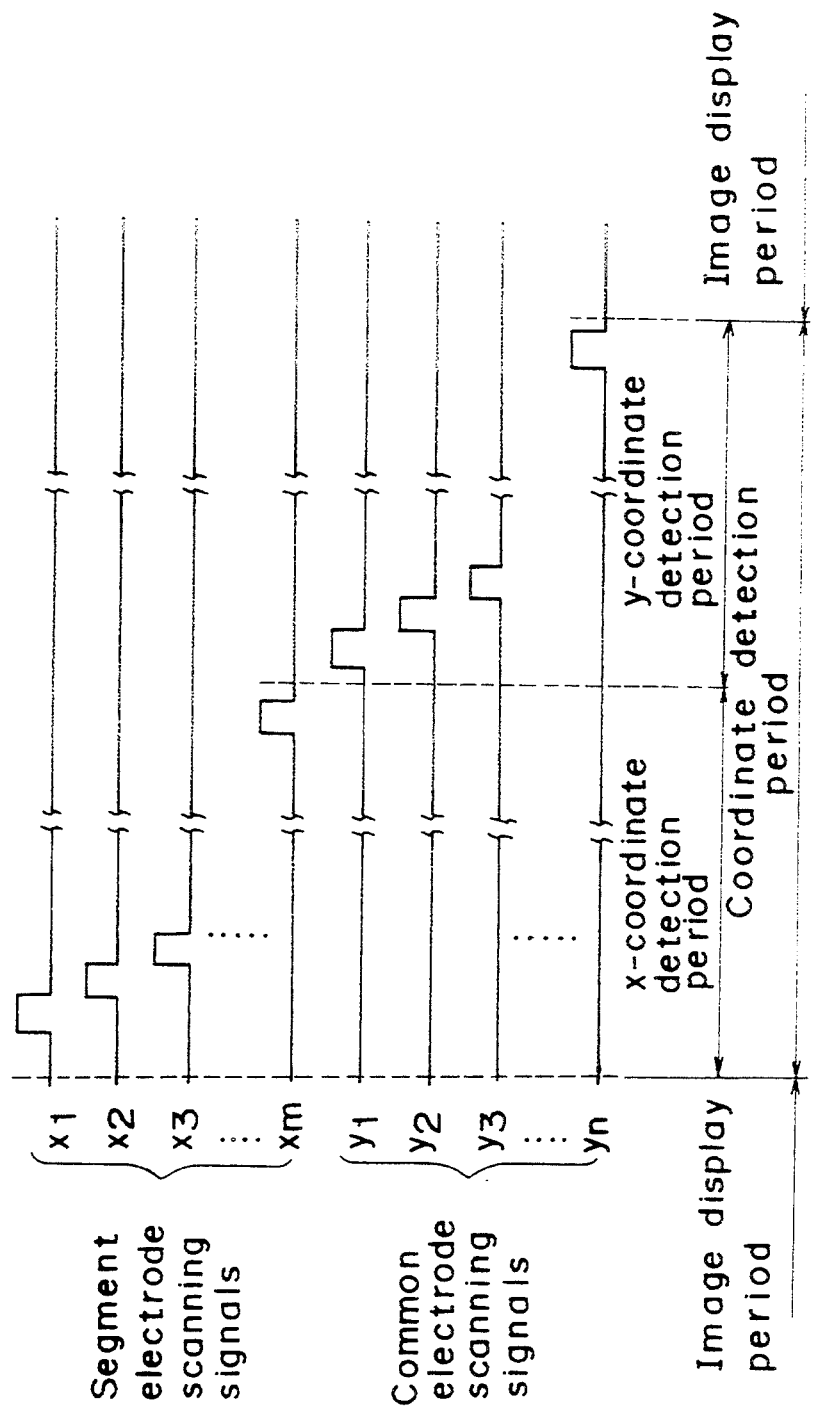
FIG. 10 is a timing chart of segment electrode scanning signals and common electrode scanning signals in the display-integrated type tablet device as shown in FIG. 8.
Figure 13:
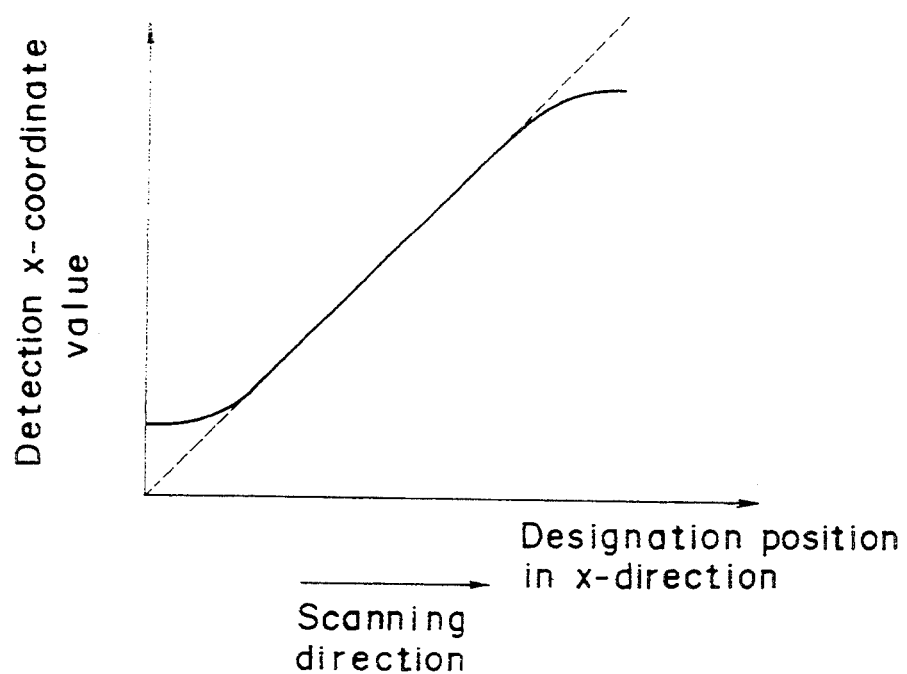
FIG. 13 is a graph for showing a relation between an x-direction designation position and a detected x-coordinate value in a central area in y-direction of the image display area.
Figure 14:
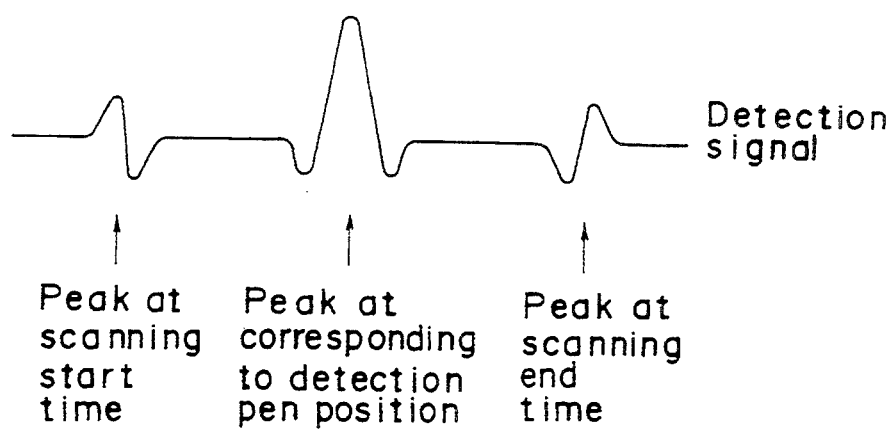
FIG. 14 is a schematic illustration of a detection signal waveform on which peaks taking place at the scanning start and end times are superimposed.
Figure 15:
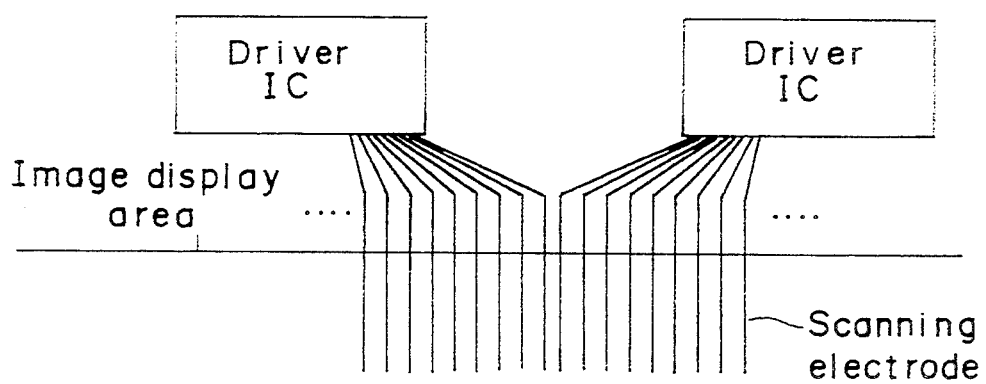
FIG. 15 is a view of a pattern of electrodes at a connection section between driver ICs and scanning electrodes.

In each of the embodiments described as follows, as shown in FIG. 1, by incorporating a correction processing circuit 13 into the display-integrated type tablet device as shown in FIG. 8 and effecting correction processing on detection coordinates obtained by a detection pen and x- and y-coordinate detection circuits, deviation i.e. displacement between an actual designation position and the detection coordinates is corrected.

<First embodiment>

Figure 2:
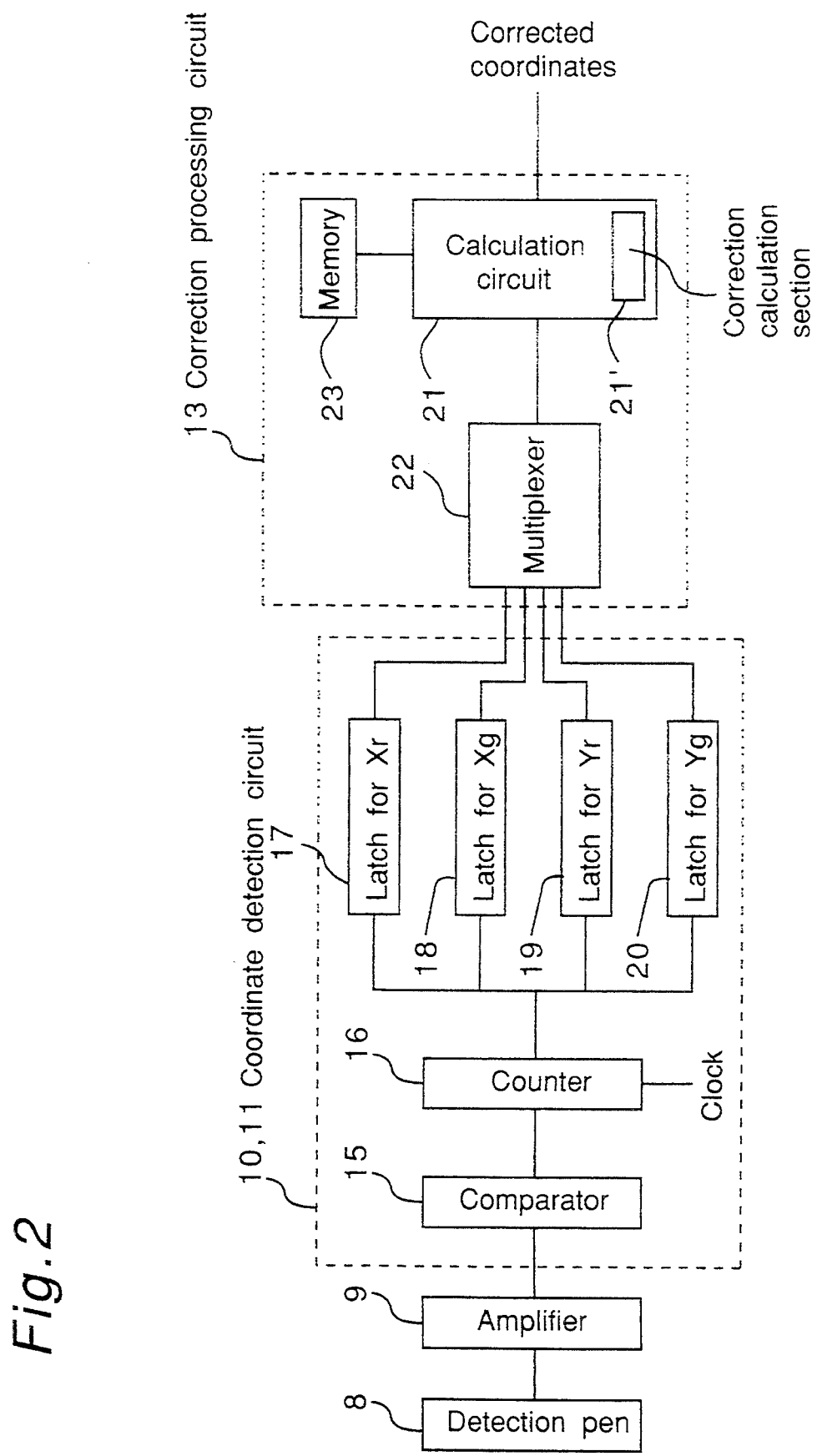
FIG. 2 is a block diagram of a coordinate detection circuit and a correction processing circuit as shown in FIG. 1.

FIG. 2 is a block diagram of an x-coordinate detection circuit 10, a y-coordinate detection circuit 11, and a correction processing circuit 13 as shown in FIG. 1.

An analog detection signal induced at the detection pen 8 is amplified in an amplifier 9 and then input to the coordinate detection circuits 10 and 11. Firstly, the detection signal is converted into a binary pulse by a comparator 15. A counter 16 counts the number of clock pulses from start of a detection period to a rise-time and a fall-time of the binary pulse. In an x-coordinate detection period, count values "Xr" and "Xg" respectively of the rise-time and the fall-time are output. In the same manner, count values "Yr" and "Yg" are output in a y-coordinate detection period. The count values "Xr", "Xg", "Yr", and "Yg" thus output are latched in latch units 17 through 20 provided exclusively therefor respectively.

A calculation circuit 21 in the correction processing circuit 13 takes in either of the count values "Xr", "Xg", "Yr", and "Yg" latched in the latch units 17 through 20 into a memory 23 by switching a multiplexer 22, and then effects correction processing on the taken-in count value by means of a correction calculation section 21'. Thus a corrected x-coordinate value or a y-coordinate value which has undergone the correction processing is output.

Figure 3A:
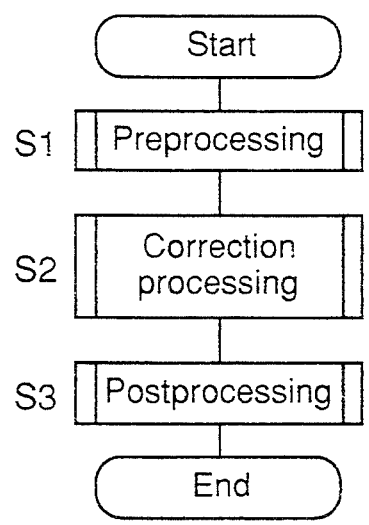
FIGS. 3(a), 3(b), and 3(c) are flowcharts respectively of a main routine, a preprocessing subroutine, and a postprocessing subroutine in a coordinate detection and correction processing operation.
Figure 3B:
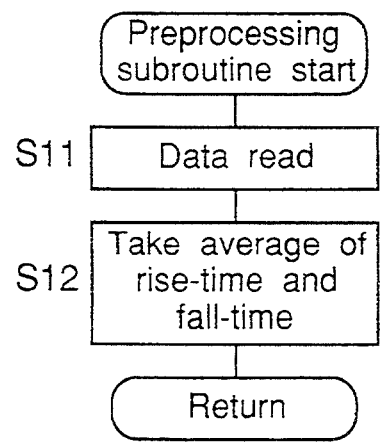
Figure 3C:
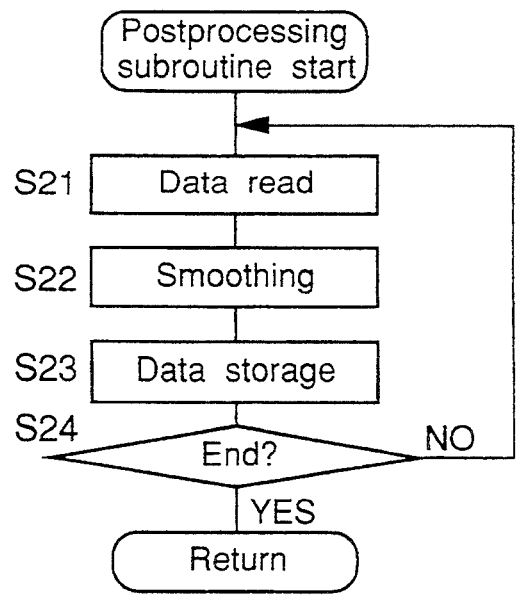

FIGS. 3(a), 3(b), and 3(c) are flowcharts of a coordinate detection and correction processing operation executed by the calculation circuit 21. It is noted that FIG. 3(a) shows a main routine, and FIGS. 3(b) and 3(c) show subroutines thereof.

Referring to FIG. 3(a), preprocessing is effected on the aforementioned count value (step S1) and thereafter correction processing is effected (step S2), and further postprocessing is effected (step S3) to end the coordinate detection and correction processing operation.

FIG. 3(b) is a flowchart of a preprocessing subroutine. Referring to FIG. 3(b), the calculation circuit 21 begins the preprocessing subroutine to start the coordinate detection processing upon detection of the fact that a pen switch (not shown) in the detection pen 8 is turned on when the detection pen 8 is pressed against the input surface of the LCD panel 1.

First, the count values latched on the latch units 17 through 20 are read into the memory 23 (step S11) in a manner as described above. Then a peak position of the analog detection signal is obtained (step S12) by taking an average of the count value "Xr"("Yr") and the count value "Xg"("Yg") (i.e., an average of the count value of the rise-time and the count value of the fall-time), and the resulting value is determined to be the above-mentioned pre-correction detection coordinate value.

The program flow then enters into the correction processing subroutine, however, reference is first made to the postprocessing subroutine.

FIG. 3(c) is a flowchart of the postprocessing subroutine. Referring to FIG. 3(c), when the correction processing subroutine ends, the corrected coordinate value is read from the memory 23 (step S21), and then a smoothing operation is effected (step S22). The coordinate value which has thus undergone the smoothing operation is stored into the memory 23 (step S23) to be used for the smoothing operation of the subsequent points (steps S21, S22, . . . ).

The main purpose of the postprocessing is to smooth a continuation of points on the LCD panel 1. In more detail, the induction voltage at the detection pen 8 is low in the time of scanning the lower electrodes and easily influenced by external noise, which tends to result in an instability of the detection coordinates. The above-mentioned fact signifies that, in terms of image display, a smoothly drawn straight line or a curve appears jaggedly on the display screen. The smoothing is effected to correct such a disadvantageous phenomenon.

As a simple and effective smoothing method, there is a method of taking an average of the current coordinate value read from the memory 23 and the coordinate value of the previous point. The processing can be effected by storing the coordinate value of the previous point.

There is another smoothing method as follows.

First, a number $(2N-1)$ of points to be subject to a calculation is set up. It is noted herein that N is a natural number. Until the number of points from the start of drawing an image on an image display means (not shown) reaches $(2N-1)$, the detection coordinate value of each point is directly transmitted to the above-mentioned image display means to be used for image display.

When the coordinates of the $(2N-1)$th point are input, a multidimensional curve approximated in minimum to the square of $(2N-1)$ points from the first point to the $(2N-1)$th point is obtained, and the coordinates of the Nth point are replaced by the coordinates of a point on the multidimensional curve. In more detail, assuming that the coordinates of the Nth point are $(X_n, Y_n)$ and the multidimensional curve is expressed by an equation $Y=F_n(X)$, a pixel having the coordinates $(X_n, f_n(X_n))$ is used for image display for the Nth point. In the above case, the $(2N-1)$th point is still effected for image display with its coordinates unchanged.

When the coordinates of the 2Nth point are input, a multidimensional curve $Y=f_{n+1}(X)$ approximated in minimum to the square of 2N points from the second point to the 2Nth point is obtained, and the coordinates $(X_{n+1}, Y_{n+1})$ of the $(N+1)$th point are replaced by the coordinates $(X_{n+1}, f_{n+1}(X_{n+1}))$ of a point on the multidimensional curve. In the above case, the 2Nth point is still effected for image display with its coordinates unchanged.

Thus, by repeating the above-mentioned operation every time the coordinates of a new point are input, a smoothed curve can be obtained.

Then the following describes the correction processing to be effected subsequent to the above-mentioned preprocessing operation.

Figure 4:
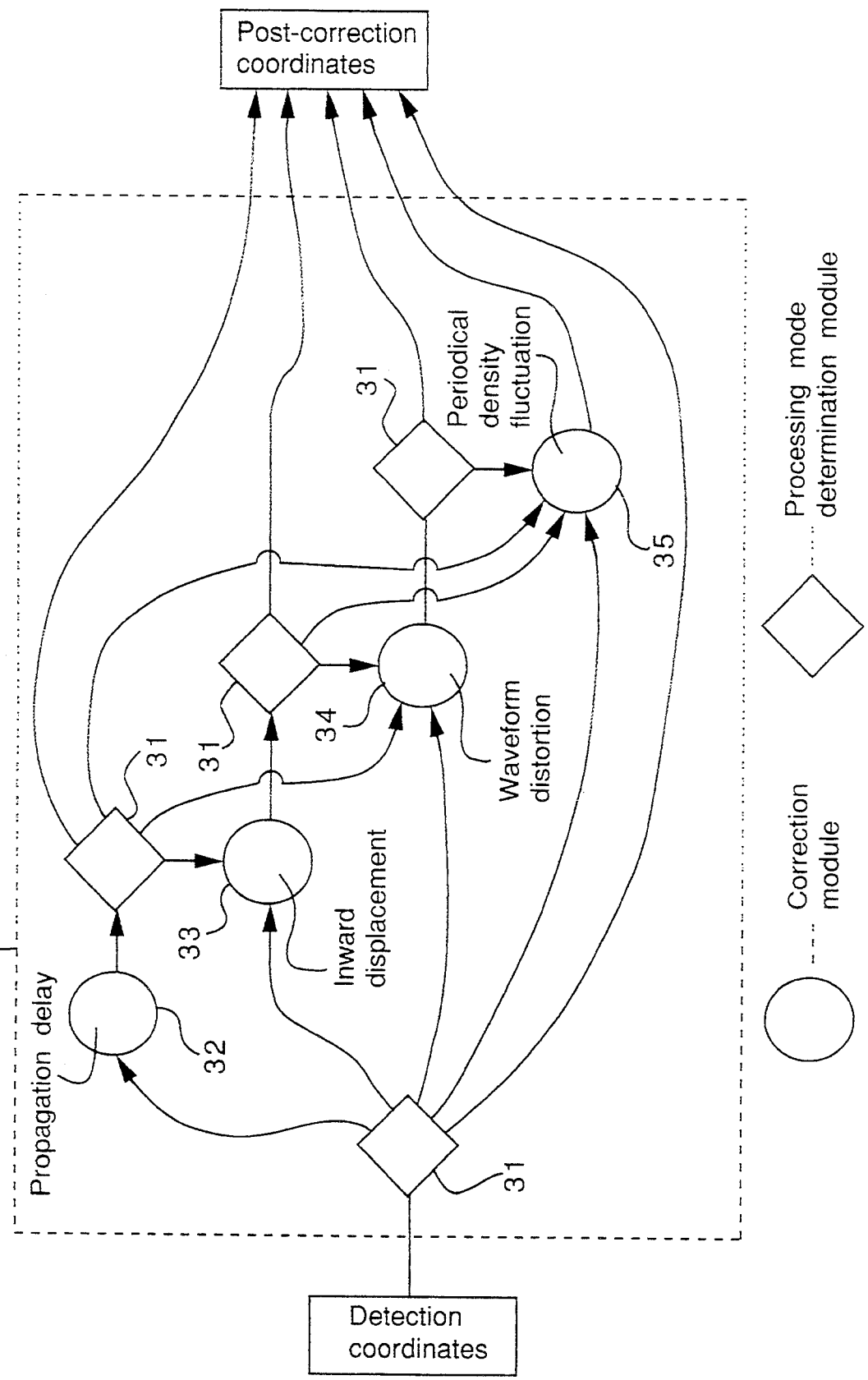
FIG. 4 is an explanatory view of each module in a correction calculation section.
Figure 5:
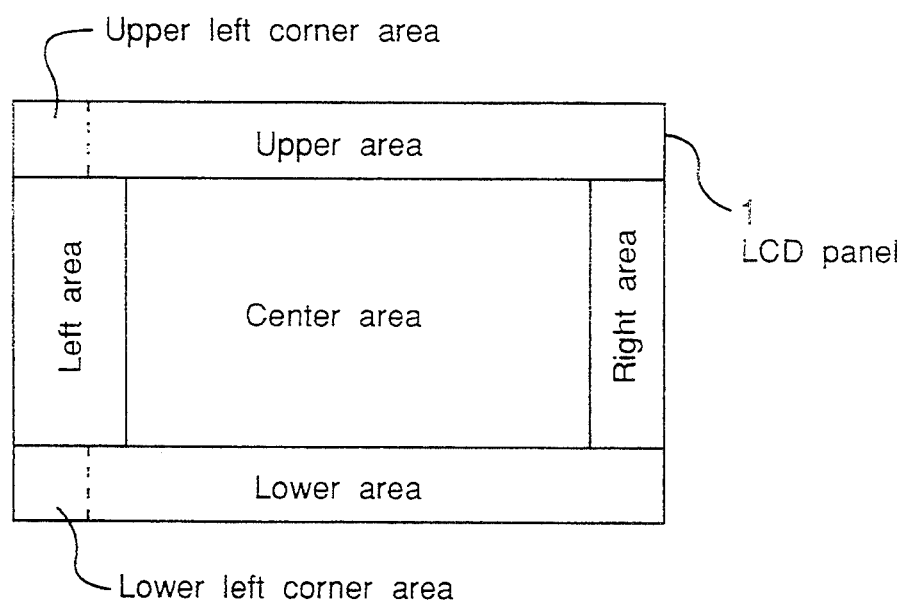
FIG. 5 is a view of an exemplified division of the image display area of an LCD panel.

In the present embodiment, by dividing the tablet (i.e., the LCD panel 1) into a plurality of areas and using the correction calculation section 21' comprised of various correction modules as shown in FIG. 4, different correction processing is effected on each of the areas. FIG. 5 shows an exemplified division of the area. It is herein assumed that the common drive circuit exists at a right portion and the segment drive circuit exists at upper and lower portions in FIG. 5.

It is noted that the x-coordinate is scanned from left to right, while the y-coordinate is scanned from bottom to top. In the above case, the x-coordinate value increases as it is closer to the right, while the y-coordinate value increases as it is closer to the top.

The above-mentioned correction modules execute the following correction processing operations.

Propagation delay correction module 32: effects correction processing on the displacement of the detection coordinate in the scanning direction (FIG. 11) depending on the distance from the driver at a point on an identical scanning electrode, which is relevant to the aforementioned first problem.

Inward displacement correction module 33: effects correction processing on the inward displacement of the detection signal waveform in the periphery of the image display area (FIG. 12), which is relevant to the aforementioned second problem.

Waveform distortion correction module 34: effects correction processing on the distortion of the detection signal waveform taking place at the scanning start and end times of the lower electrodes, which is relevant to the aforementioned third problem.

Figure 16:
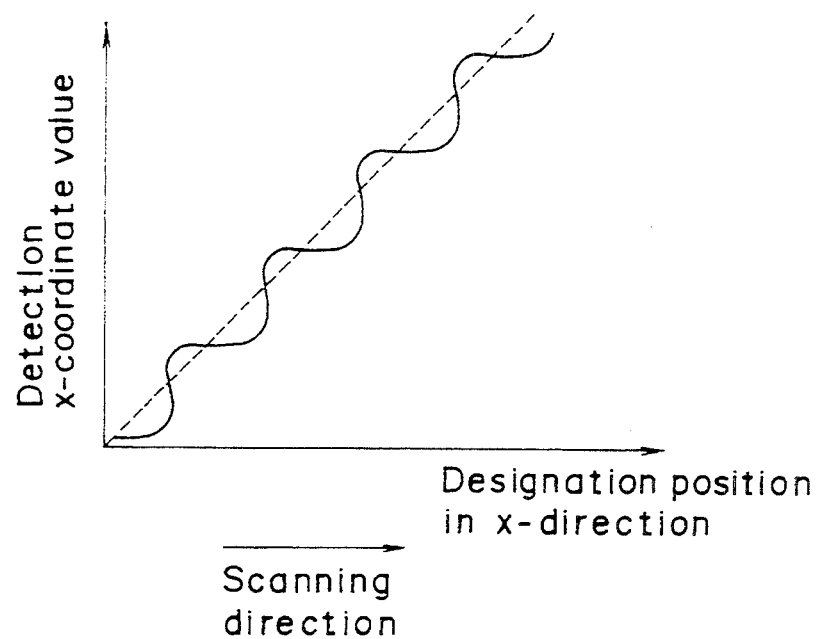
FIG. 16 is a graph showing a relation between an x-direction designation position and a detected x-coordinate value in a peripheral area in y-direction of the image display area.

Periodical density fluctuation correction module 35: effects correction processing on the fluctuation of the detection coordinates (FIG. 16) depending on the variation in distribution density of the electrodes in the periphery of the image display area, which is relevant to the aforementioned fourth problem.

It is noted that each of the correction modules is comprised of a correction formula composed of a polynomial, an exponential function, a trigonometric function, or a combination of them or a lookup table (abbreviated to the "LUT" hereinafter). Regarding each correction module, there are independently provided a unit for the x-coordinate and a unit for the y-coordinate (note that the units for both the coordinates are shown as integrated in FIG. 4).

Figure 7:
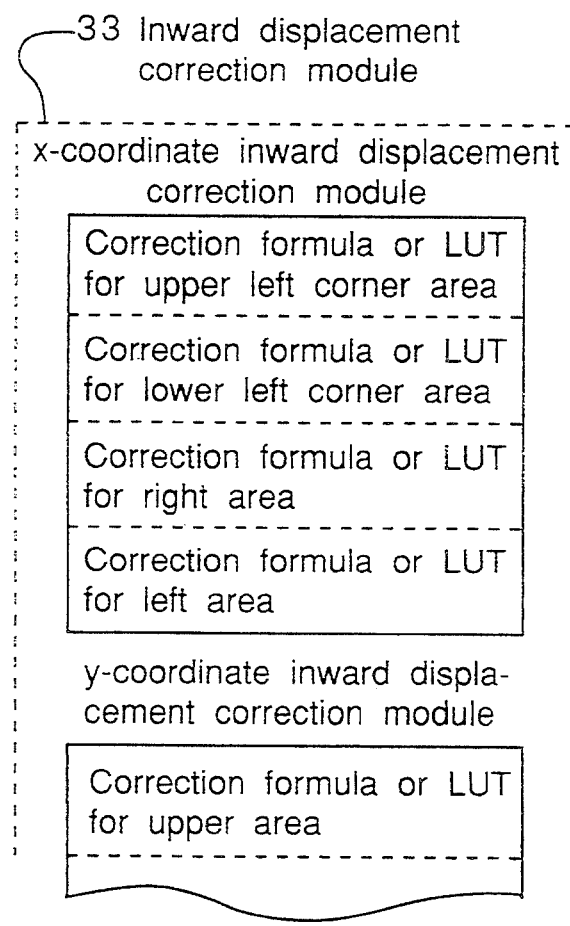
FIG. 7 is a view of an exemplified allocation of correction formulas or LUTs stored in a correction module.

Furthermore, each correction module has a plurality of correction formulas or LUTs as shown in FIG. 7 in order to cope with the different correction processing operations for each division of the LCD panel 1 as shown in FIG. 5.

Figure 6A:
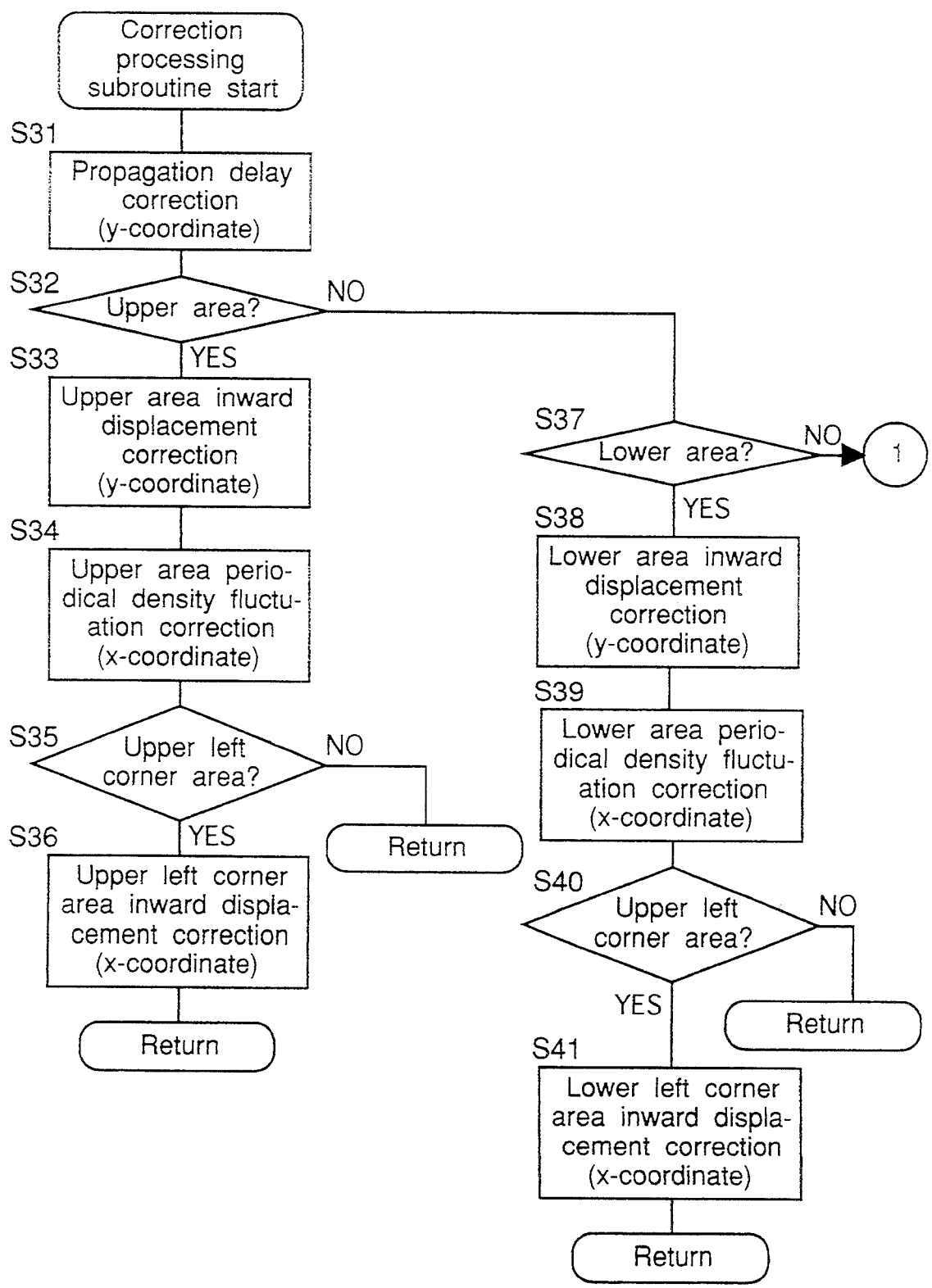
FIGS. 6(a) and 6(b) are each part of a flowchart of a correction processing subroutine.
Figure 6B:
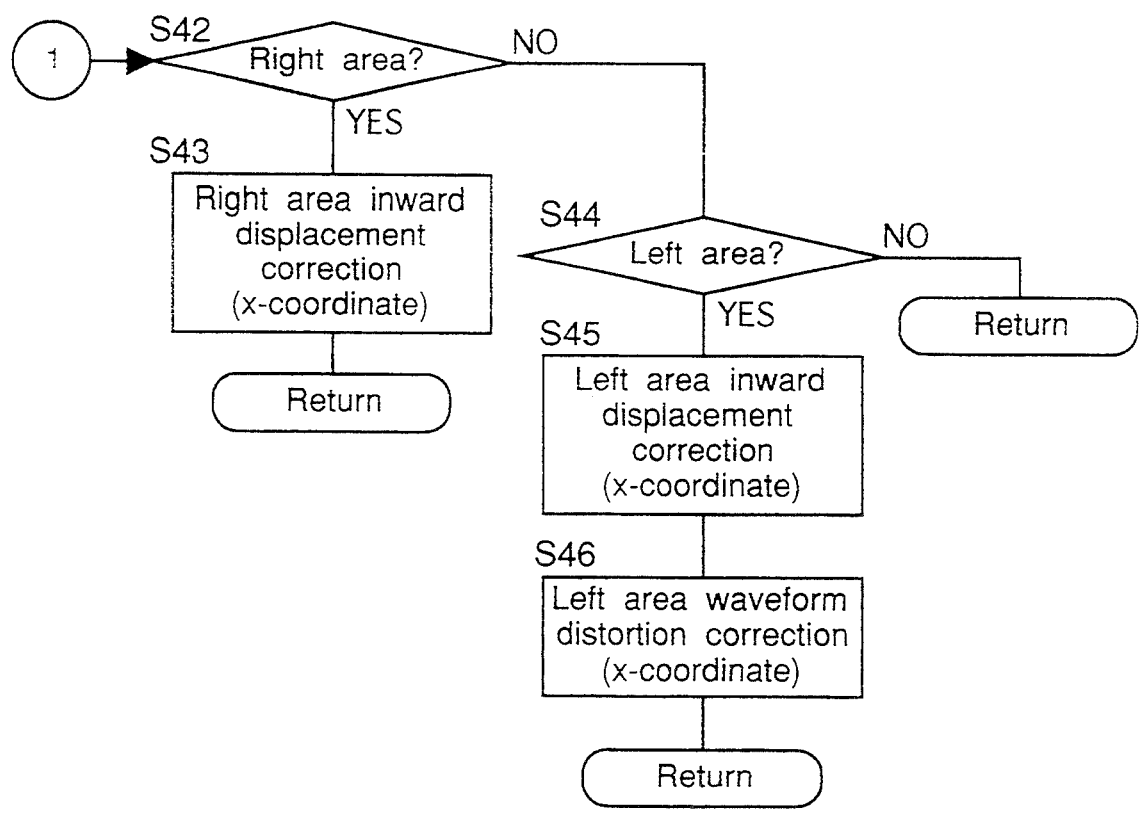

FIGS. 6(a) and 6(b) show a flowchart of a correction processing subroutine to be effected on each division area as shown in FIG. 5. The following describes in detail the correction processing subroutine with reference to FIGS. 4, 5, and 6(a) and 6(b).

First, a propagation delay correction is effected on the detection y-coordinate value of the taken-in detection coordinates by the propagation delay correction module 32 (step S31). The above-mentioned propagation delay correction is effected on the entire area of the LCD panel 1.

The details of the propagation delay correction are as follows.

A y-count value obtained on a horizontal line where Y is constant (Y: y-direction designation position) is ideally constant independent of the x-direction position. The constant value is assumed to be $y_a$. The actually detected y-count value is assumed to be y, a difference Δy between the detected value and the theoretical value can be expressed as:

$$\Delta y = y - y_a \quad (1)$$

Figure 17:
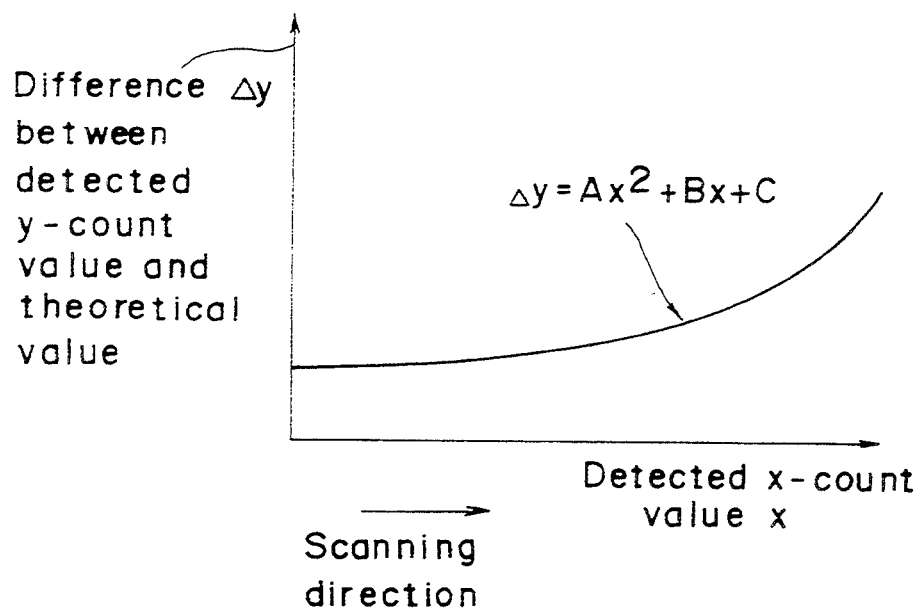
FIG. 17 is a graph showing a relation between a detected x-count value and the difference between a detected y-count value and its theoretical value in a propagation delay correction operation.

It is assumed that the relation between Δy and the x-count value, as exemplified in FIG. 17, can be approximated to:

$$\Delta y = Ax^2 + Bx + C \quad (2)$$

where A, B, and C are constants obtained through measurement. According to the above-mentioned relation, the propagation delay of the y-count value can be corrected by executing a calculation from the detected x- and y-count values as follows:

$$\begin{aligned} Y_a &= y - \Delta y \\ &= y - (Ax^2 + Bx + C) \end{aligned} \quad (3)$$

Then the y-coordinate value which have undergone the propagation delay correction is input to the processing mode determination module 31. When the coordinates belong to an upper area (step S32), upper area inward displacement correction is effected on the y-coordinate value by the inward displacement correction module 33 (step S33), and upper area periodical density fluctuation correction is effected on the x-coordinate value by the periodical density fluctuation correction module 35 (step S34).

In the above case, a correction formula or an LUT set up for the upper area is used in each of the modules 33 and 35. Meanwhile, the processing mode determination module 31 determines the area to which the detection coordinates belong to determine a correction module to be used in the next processing operation and determine a correction formula or an LUT to be used in the determined correction module.

The x-coordinate value which has undergone the upper area periodical density fluctuation correction at step S34 is input further to the processing mode determination module 31. When it is determined that the detection coordinates belong to an upper left area (step S35), upper left corner inward displacement correction is effected on the x-coordinate value by the inward displacement correction module 33 (step S36), and then the program flow returns to the main routine.

In the above case, a correction formula or an LUT set up for the upper left corner area is used in the inward displacement correction module 33 in the same manner as the aforementioned case. When the detection coordinates does not belong to the upper left corner area, the program flow returns directly to the main routine.

When it is determined that the detection coordinates belong to a lower area by the processing mode determination module 31 in the first stage (steps S32 and S37), the same processing operation as described on the upper area is executed (steps S38 through S41). In the above case, a correction formula or an LUT set up for the lower area is also used in each of the modules 33 and 35.

The following describes in detail the inward displacement correction operation taking the y-coordinate as an example.

The theoretical y-count value v to be detected can be expressed by a y-direction designation position Y as follows.

$$v = \kappa Y + v_o \quad (4)$$

where $\kappa$ is a constant determined by the y-electrode interval and the ratio between the scanning pulse and the count pulse, and $v_o$ is an offset value. As apparent from the equation (4), there is a linear relation between the theoretical y-count value v and the y-direction designation position Y. In other words, the theoretical y-count value v expresses the y-direction designation position Y in another form. In order to make the designation position coincide with the detection coordinate, the y-count value y to be detected and the theoretical y-count value v must be equal to each other (y=v).

Figure 18:
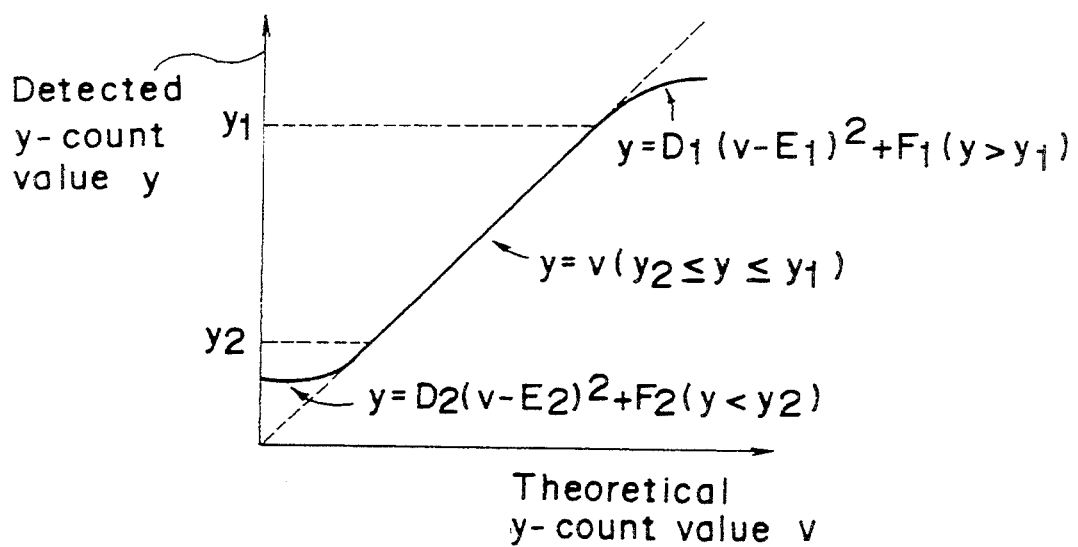
FIG. 18 is a graph showing a relation between a detected count value and its theoretical count value in an inward displacement correction operation.

However, the relation between the y-count value y to be actually detected and the theoretical y-count value v is as exemplified in a solid line in FIG. 18, where the relation of y=v is not satisfied in the periphery. Therefore, a functional relation in the periphery is approximated to a numerical formula in the same manner as in the case of propagation delay correction. Here is now provided an example where the relation is approximated to a quadratic equation as follows:

$$y = D_1(v - E_1)^2 + F_1 \quad (y > y_1: \text{upper side}) \quad (5)$$

$$y = D_2(v - E_2)^2 + F_2 \quad (y < y_2: \text{lower side}) \quad (6)$$

where $D_i$, $E_i$, $F_i$, and $y_i$ (i=1, 2) are constants obtained through measurement. Here are now obtained, from the equations (5) and (6), the equations as follows:

$$v = E_1 - \{(y - F_1)/D_1\}^{\frac{1}{2}} \quad (y > y_1: \text{upper side}) \quad (7)$$

$$v = E_2 - \{(y - F_2)/D_2\}^{\frac{1}{2}} \quad (y > y_2: \text{upper side}) \quad (8)$$

According to the equations (7) and (8), the detected y-count value y can be converted into the theoretical y-count value v. The above operation is nothing but the inward displacement correction. The same thing can be said for the x-coordinate value.

The following describes in detail the periodical fluctuation correction taking the x-coordinate as an example.

The theoretical x-count value u to be detected can be expressed by an x-coordinate designation position X as follows:

$$u = \lambda X + u_o \quad (9)$$

where $\lambda$ is a constant determined by the x-coordinate electrode interval and a ratio between the scanning pulse and the count pulse, and $u_o$ is an offset value. As apparent from the equation (9), there is a linear relation between the theoretical x-count value u and the x-direction designation position X. In other words, the theoretical x-count value u expresses the x-direction designation position X in another form. In order to make the designation position coincide with the detection coordinates, the x-count value x to be detected and the theoretical x-count value u must be equal to each other (x=u).

However, the actually detected x-count value x periodically fluctuates with respect to the theoretical x-count value u as shown in FIG. 19. Furthermore, the amplitude of the fluctuation gradually increases as it is closer to an end portion. In the above case, the period of the fluctuation does not change. Regarding the upper area as shown in FIG. 5, the amplitude of the fluctuation is small in a position far from the end portion ($y = y_4$), and the amplitude is great in a position close to the end portion ($y = y_3$, $y_3 > y_4$). Assuming that the difference between the detected value and the theoretical value is $\Delta x$, the $\Delta x$ is expressed as follows:

$$\Delta x = x - u \tag{10}$$

Taking the fact that $\Delta x$ exhibits a tendency as shown in FIG. 19 into account, $\Delta x$ is approximated, for example, to:

$$\Delta x = G_1(y - H_1) \sin(I_1 x) \tag{11}$$

where $G_1$, $H_1$, and $I_1$ are constants obtained through measurement. Here are now obtained, from the equations (10) and (11), the equations as follows:

$$\begin{aligned} u &= x - \Delta x \\ &= x - G_1(y - H_1)\sin(I_1 x) \end{aligned} \tag{12}$$

According to the equation (12), the detected count value x can be converted into the theoretical x-count value u. The above operation is nothing but the periodical fluctuation correction. The same thing can be said for the lower area.

The upper left corner inward displacement correction (x-coordinate), which is fundamentally the same as the general inward displacement correction, has a feature that the displacement $\Delta x$ between the detected value and the theoretical value increases according as it is closer to the end portion. Therefore, a correction formula therefor is expressed by the equation as follows:

$$u = K_1 + \{(x - L_1)/J_1\}^{\frac{1}{2}} + M_1(y - N_1) \tag{13}$$

where $J_1$, $K_1$, $L_1$, $M_1$, and $N_1$ are constants obtained through measurement. The same thing can be said for the lower left corner inward displacement correction.

Then the x-coordinate value which has undergone the propagation delay correction at step S31 is input to the processing mode determination module 31. When it is determined that the detection coordinates belong to a right area (steps S32, S37, and S42), right area inward displacement correction is effected on the x-coordinate value by the inward displacement correction module 33 (step S43), and the program flow returns to the main routine.

In the inward displacement correction module 33, a correction formula or an LUT set up for the right area is used.

Then the x-coordinate value which has undergone the propagation delay correction at step S31 is input to the processing mode determination module. When it is determined that the detection coordinates belong to a left area (steps S32, S37, S42, and S44), left area inward displacement correction is effected on the x-coordinate value by the inward displacement correction module 33 (step S45). Thereafter left area waveform distortion correction is effected on the x-coordinate value by the waveform distortion correction module 34, and then the program flow returns to the main routine. In each of the modules 33 and 34, the correction formula or the LUT set up for the left area is used.

The theory of the waveform distortion correction is the same as that of the inward displacement correction. The relation between the detected x-count value x and the theoretical x-count value u is approximated, for example, to:

$$x = P(u - Q)^2 + R \tag{14}$$

Then there is obtained from the equation (14) the equation as follows:

$$u = Q + \{(x - R)/P\}^{\frac{1}{2}} \tag{15}$$

according to which the detected x-count value x is converted into the theoretical x-count value u. In the equation (15), P, Q, and R are constants obtained through measurement.

Thus the correction processing subroutine is completed and the program flow proceeds to the aforementioned postprocessing subroutine to effect a smoothing operation and the like. Based on the thus obtained corrected coordinates, a dot image is displayed on the image display.

The above described the correction processing operation according to the flowchart shown in FIG. 6. FIG. 20 shows an exemplified set of correction formulas necessary for the entire correction calculation. The coefficients A through R in the correction formulas are constants obtained through measurement.

Although the above described the correction method totally by means of numerical formulas, an LUT can be used totally or partially. FIG. 21 shows an exemplified LUT for the upper area inward displacement correction (y-coordinate). The LUT is a table of $2 \times m$ which outputs a correction y-count value $e_k$ ($k = 0, 1, 2, \ldots m$) when a detected y-count value $i_k$ is input. In the LUT, $i_k$ is an orderly sequence of integers, and $e_k$ is an integer which has been preliminarily calculated according to the equation as follows:

$$e_k = E_1 - \{(i_k - F_1)/D_1\}^{\frac{1}{2}} \tag{7}''$$

and thereafter rounded by counting fractions of 0.5 and over as a unit and cutting away the rest.

FIG. 22 shows an LUT for the upper area periodical fluctuation correction (x-coordinate) as another example. The LUT is a table of $m \times n$ which outputs a correction x-count value $e_k l$ ($k = 0, 1, 2, \ldots m$) ($l = 0, 1, 2, \ldots, n$) when a detected x-count value $i_{xk}$ and a detected y-count value $i_y l$ are input. In the LUT, each of $i_{xk}$ and $i_y l$ is an orderly sequence of integers, and $e_k l$ is an integer which has been preliminarily calculated according to the equation as follows:

$$e_k l = i_{xk} - G_1(i_y l - H_1) \sin(I_1 i_{xk}) \tag{12}''$$

and thereafter rounded by counting fractions of 0.5 and over as a unit and cutting away the rest.

In the course of the above-mentioned operation, the correction effect can be changed according to the order of using each correction module. For instance, different effects are obtained depending on the case where the waveform distortion correction is performed after performing the inward displacement correction and the case where the inward displacement correction is performed after performing the waveform distortion correction.

Furthermore, the shape of each area can be varied depending on the time of using the processing mode determination module.

Furthermore, the number of division areas of the LCD panel 1 and the contents of the correction formula or the size of the LUT are determined according to the characteristics of the tablet, a desired coordinate detection accuracy, a required operation speed, the performance of the calculation circuit 21, memory capacity, and other factors. Therefore, an optimum algorithm is formed according to the characteristics of the tablet to be used.

With the above-mentioned coordinate detection and correction processing operation composed of a sequence of preprocessing, correction processing, and postprocessing, the displacement between the designation position and the detection coordinates can be limited within a desired accuracy to allow a drawing or a letter to be input as if they were handwritten on a paper when the LCD panel 1 is used as a tablet.

According to the present embodiment as described above, the detection coordinates detected by the x-coordinate detection circuit 10 and the y-coordinate detection circuit 11 are taken into the correction processing circuit 13. Then the processing mode determination module 31 in the correction calculation section 21' of the correction processing circuit 13 determines which area on the LCD panel 1 the taken-in detection coordinates belong to. Based on the determination result, the detection coordinates are transmitted to the optimum one of the correction modules 32 through 35 according to each area and scanning direction. Then each correction processing is effected on the detection coordinates by means of the optimum one of the correction modules 32 through 35 according to the detection coordinates.

With the above-mentioned arrangement, the displacement between the detection coordinates and the designation position taking place in each division area of the LCD panel 1 is appropriately corrected by a correction module corresponding to the type of the displacement. Thus the pixel located at the position designated by the detection pen 8 is displayed on the LCD panel 1 to allow the display-integrated type tablet device to function appropriately.

<Second embodiment>

It is assumed now that a calculation time necessary for the inward displacement correction is $t_s$ and a calculation time necessary for the waveform distortion correction is $t_H$ in the above-mentioned first embodiment. When the inward displacement correction and the waveform distortion correction are both effected on an identical area (when detection coordinates exist in the left area), there is required a total correction calculation time $(t_s+t_H)$ in order to use the two correction modules.

In such a case, the required calculation time for the correction operations can be reduced by integratingly handling the inward displacement correction and the waveform distortion correction in one integrated module.

In more detail, in an area where the inward displacement and the waveform distortion are superimposed on the detection signal from the detection pen 8 as in the left area of the LCD panel 1, the inward displacement and the waveform distortion are considered to be an inseparable phenomenon and one correction formula or LUT is set up. The calculation time required in the above case is generally shorter than the time $(t_s+t_H)$.

The more the correction formulas to be integrated are alike or the more the LUT size is greater, the more the reduction of the required time is effective.

In regard to the integration of correction modules, two correction modules are not only integrated into one correction module, but also three or more correction modules may be integrated into one correction module.

The integration of correction modules is effective when a greater importance is attached to the processing speed than to the position detection accuracy or when a smaller number of division areas exist and the correction processing for each area is complicated.

It should be noted that each of the above-mentioned embodiments is not limited to the duty ratio control type LCD panel, and can be also applied to a TFT (thin film transistor) type LCD panel or an EL (Electroluminescence) panel.

As apparent in the above description, the display-integrated type tablet device of the first aspect of the present invention is provided with a correction processing circuit having a processing mode determination module and a plurality of correction modules. The processing mode determination module takes in a detection x-coordinate value and a detection y-coordinate value detected by the coordinate detection circuit to determine a correction processing mode to be effected. By a correction module based on the result of the determination, the detection coordinates consisting of the detection x-coordinate value and the detection y-coordinate value are corrected to allow the displacement between the detection coordinates and the designation position of the detection pen to be corrected.

The display-integrated type tablet device of the second aspect of the present invention has the following advantageous features. When the correction module to be used based on the result of the determination is the propagation delay correction module, displacement of the aforementioned detection coordinates in the scanning direction attributed to the propagation delay of the scanning pulse is corrected. When the correction module is the inward displacement correction module, inward displacement of the detection coordinates attributed to a reduction in number of the first electrodes or the second electrodes is corrected. When the correction module is the waveform distortion correction module, distortion of the detection coordinates accompanied by a waveform distortion attributed to a peak irrelevant to the position of the detection pen taking place in the output signal at the time of starting and ending the scanning is corrected. When the correction module is the periodical density fluctuation correction module, a periodical fluctuation of the detection coordinates attributed to a variation in distribution density of the first and second electrodes in the periphery of the image display area is corrected. With the above-mentioned arrangements, any displacement between the detection coordinates and the designation position can be corrected more properly to allow a desired coordinate detection accuracy to be achieved.

According to the display-integrated type tablet device of the third aspect of the present invention, at least two of the propagation delay correction module, the inward displacement correction module, the waveform distortion correction module, and the periodical density fluctuation correction module are integrated into one correction module. Therefore, correction processing operations relevant to the two correction modules can be rapidly effected by the integrated one correction module.

According to the display-integrated type tablet device of the fourth aspect of the present invention, the entire display panel is divided into a plurality of areas, and each of the correction modules has a numerical formula defining a relation between the designation position and the detection coordinates or an LUT formed based on the numerical formula for each of the areas. Therefore, the conditional determination speed is increased. When the numerical formula is used, the memory capacity necessary for the program can be saved. When the LUT is used, the processing speed can be increased.

According to the display-integrated type tablet device of the fifth aspect of the present invention, when there is an area in which at least one of the four correction processing modes is an unnecessary processing mode, a corresponding numerical formula or LUT of the unnecessary processing mode for the area is eliminated from the relevant correction module to allow the processing speed to be further increased.

With the above-mentioned arrangement, the displacement between the detection coordinates and the designation position can be corrected appropriately and rapidly to allow a desired detection coordinate accuracy to be achieved.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A display-integrated type table device including a display panel driven by first electrodes and second electrodes crossing each other at right angles, a detection pen having at a tip thereof an electrode which can be electrostatically coupled with the first electrodes and the second electrodes, a first electrode drive circuit for driving the first electrodes, a second electrode drive circuit for driving the second electrodes, a display control circuit for displaying an image on the display panel by controlling the first electrode drive circuit and the second electrode drive circuit in an image display period, a detection control circuit for sequentially scanning at least one of the first and second electrodes of the display panel by controlling at least one of the first and second drive circuits in a coordinate detection period, and a coordinate detection circuit for detecting at least one of a detection x-coordinate value and a detection y-coordinate value on the display panel designated by the tip of the detection pen based on a time of generating an output signal from the detection pen and a time of scanning at least one of the first and second electrodes, the display-integrated type table device comprising a correction processing circuit which has an inward displacement correction module for correcting an inward displacement of at least one of the detection x-coordinate value and the detection y-coordinate value attributed to a reduction in number of at least one of the first electrodes and the second electrodes to which a scanning pulse is applied.

* * * * *